3,740,232
AGGLOMERATION OF INSTANT COFFEE

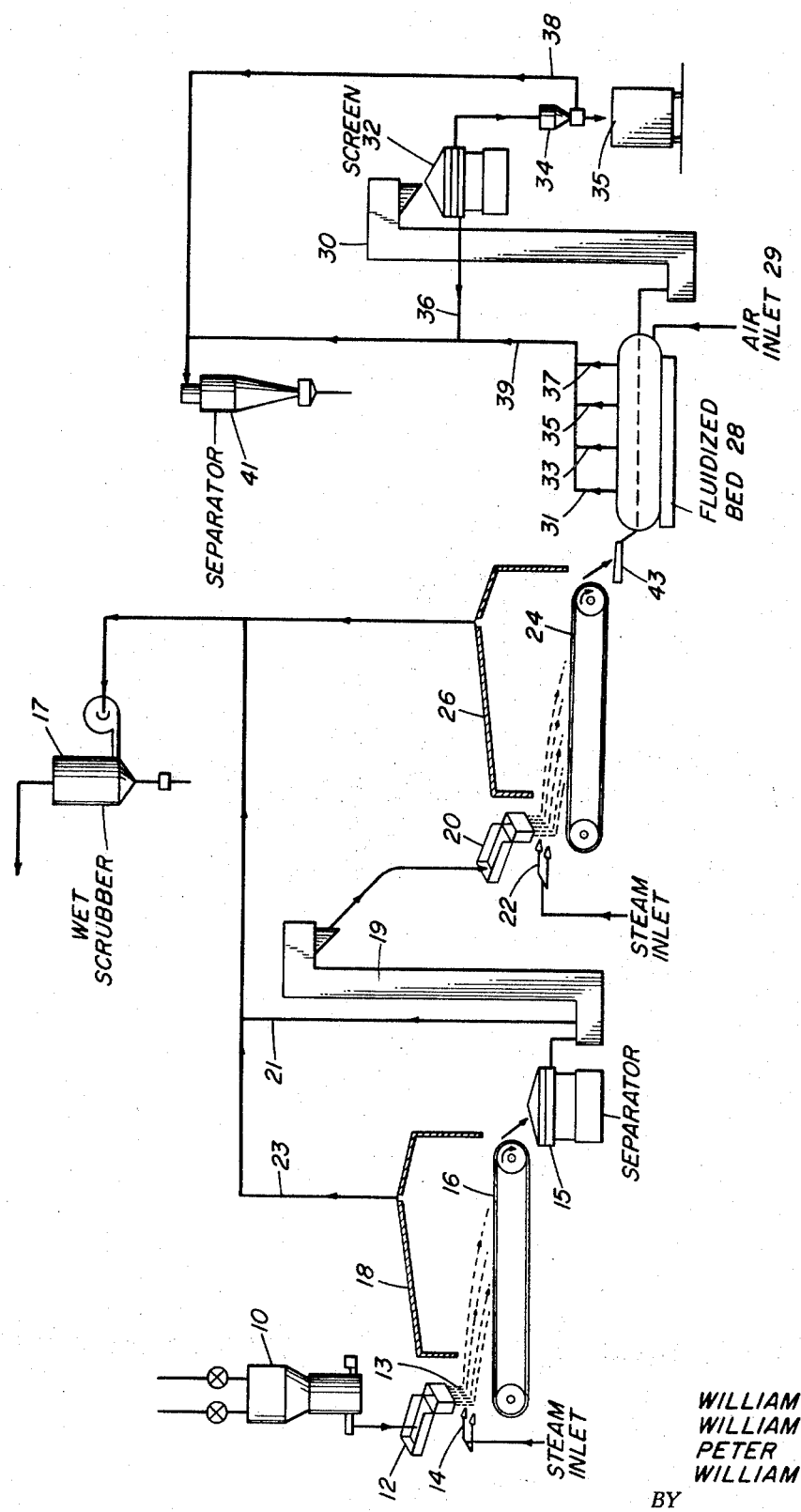

William F. Purves, Islington, William F. Lee, Dollard Des Ormeaux, Peter H. Davies, Pointe Claire, and William J. Jeffery, Chateauguay Centre, Quebec, Canada, assignors to General Foods Limited, Toronto, Ontario, Canada
Filed May 20, 1971, Ser. No. 145,150
Int. Cl. A23f 1/08
U.S. Cl. 99—71    8 Claims

ABSTRACT OF THE DISCLOSURE

This invention relates to the agglomeration of water soluble products in fine powder form such as coffee wherein the product is formed into a falling curtain and then carried in a horizontal direction by jets of steam that are directed through the curtain. The use of steam jets in the agglomeration of coffee in this way is not broadly new. The novel aspect of this invention is the performing of the steam entraining function over a conveyor so that as the steam agglomerated powder drops, it is caught by the conveyor. The successful operation of the agglomeration process in this way depends upon the controlling of the atmosphere above the conveyor and in this respect, the excess moisture from the steam jets must be exhausted from the atmosphere above the conveyor at a rate that maintains a vapour cloud above a substantial portion of the conveyor that is capable of imparting moisture to some of the product as it falls on the conveyor and during its residence time on the conveyor.

BACKGROUND OF THE INVENTION

This invention relates to a method and apparatus for the agglomeration of fine water soluble powdered materials, such as ground spray-dried coffee, dried fat emulsions, milk powder or mixtures thereof.

It is known to take ground spray-dried coffee particles having a diameter of about one one-thousandth of an inch, agglomerate them and impart moisture to them by forming them into a falling curtain and directing a jet of steam into the curtain and then fusing and drying the moist agglomerated product to form strong solidified particles that are capable of withstanding the stresses of modern packaging. In the case of coffee, the solidified particle is known as instant coffee and one can reconstitute a coffee beverage by merely adding water to the solidified product.

It is not broadly new to agglomerate and add moisture to a powdered material by dropping the powder in the form of a continuous vertical curtain and intersecting the curtain with a steam jet to form wet agglomerates, which are subsequently fused and dried. The steaming technique has been broadly disclosed in U.S. Pat. 2,977,203 to Sienkiewicz et al., and is also disclosed in U.S. Pats. 3,424,589; 3,554,760 and 3,615,670.

In the most commonly used processes, the agglomerates are formed by steaming and then fused and dried in a tower wherein the wet agglomerates fall through the tower and are contacted with warm air which flows co-currently with the particles. It is usual to pre-cool the dried particles with carbon dioxide before intersecting them with steam in order to increase the moisture uptake. The fusing operation which takes place in the tower is a difficult one to control and an expensive one to set up. Moreover, the end product in many cases has a relatively large percentage of unagglomerated fine particles which are undesirable.

The apparatus and methods of the prior art are relatively costly to set up, relatively inflexible from the point of view of adjustment to achieve quality control and yield a product that, in at least some cases, has a relatively large percentage of unagglomerated fine powder.

It is an object of this invention to provide an apparatus and a method of agglomerating water-soluble product in fine powder form that is simple, relatively inexpensive to acquire and operate, and capable of manipulation to achieve better quality control.

SUMMARY OF THE INVENTION

With these and other objects in view, the method of agglomerating a water-soluble product in fine powder form according to this invention comprises the steps of forming the powder into a falling curtain, directing jets of steam into said falling curtain to entrain the powder and carry the powder to the conveying run of a conveyor, the said steam having a pressure to agglomerate and impart moisture to at least a substantial part of said powder, exhausting moisture resulting from said steam from the atmosphere above the conveying run of said conveyor at a rate that maintains a water vapour cloud over a substantial portion of the conveying run of said conveyor that is capable of imparting moisture to some of said powder as it falls on the conveying run of said conveyor and during its residence time on the conveying run of said conveyor, collecting said moistened and agglomerated powder at the end of the conveying run of said conveyor and then fusing and drying it.

DESCRIPTION OF THE PREFERRED EMBODIMENT

The invention will be clearly understood after reference to the following detailed specification read in conjunction with the drawings.

In the drawings,

The figure is a schematic ilustration of apparatus according to the invention.

The invention will be described in relation to the agglomeration and fusion of powdered coffee. The process for making powdered coffee includes the spray-drying of a coffee beverage. This usually results in a particle having a diameter of about one one-hundredth of an inch. These particles are ground in a pin-mill or similar grinder to yield a water soluble particle having a diameter of about one one-thousandth of an inch. The general process for making these fine powders into instant coffee consists of the agglomeration of the powder to yield a weak agglomerated mass and then the fusion of this weak agglomerated mass to form a solidified particle. Following fusion, the particle is dried.

Fine coffee particles are fed from a hopper 10 to and through a feeder box 12 in the form of a vertical curtain 13. The operation of feeder box 12 to dispense coffee in a falling curtain is known and not a part of this invention. The curtain of coffee particles from the feeder box 12 is intersected by steam from horizontally directed steam jets 14 which entrain the coffee powder and carry it onto the upper horizontally extending conveying run of the conveyor 16. Conveyor 16 is long enough so that it catches on its upper surface the coffee particles with the longest travel. These particles travel ten to twenty feet and a conveyor twenty feet in length is satisfactory.

The steam from jets 14 wets and agglomerates a substantial portion of the coffee particles. The coffee particles must have a predetermined moisture content before they are fused and dried and in this respect the moisture imparted by the steam nozzles is a function of the steam pressure. With coffee, it has been found that a steam pressure of between five and fifteen pounds per square inch will moisten, agglomerate and drive the coffee in a horizontal direction with sufficient force to deposit it on the conveyor 16.

The apparatus illustrated in the drawings has been satisfactorily operated with a throughput rate for the box 12 of about 1000 pounds of finely ground coffee per hour, a steam pressure of about 14 pounds per square inch, and a residence time for the coffee on the conveyor 16 of about ⅛ of a minute. The feed box 12 is about 13 inches wide, the conveyor belt is about 52 inches wide, and the exhaust hood 18 is about 12 feet long and extends substantially for the full width of the upper flight of the conveyor 16. These operating conditions result in a deposit of coffee product on the upper surface of the conveyor about 1½ inches in depth.

The object of this process step is, of course, to agglomerate the coffee powder and at the same time raise the moisture content of the agglomerated mass without having so much free condensed water that the water in the agglomerated mass causes the mass to become unduly gummy or become a solution.

The exhaust hood 18 has a slight vacuum at its outlet that is adapted to take away the excess moisture from the area above the carrying surface of the conveyor 16 and in this respect, ideal conditions of operation are conditions wherein there is a moisture vapour cloud above substantially all of the conveying extent of the conveyor 16 but little or no free condensed water falling into the bed of coffee product.

The moist atmosphere from the hood 18 is drawn off upwardly through line 23 to a wet scrubber, generally indicated by the numeral 17, which functions to remove the entrained fine coffee particles therefrom prior to its discharge to atmosphere outside of the building where the process is carried on. The wet concentrate containing the particles can be conducted back to the percolating process from which the powdered coffee that is fed through the hopper 10 is made. The use of the scrubber and the feed-back of the wet concentrate are desirable but not essential to this invention.

Coffee entrained by the steam from the nozzles 14 passes through the vapour cloud as it falls to the upper flight of the conveyor and picks up moisture as it passes through the cloud. Further, it picks up moisture from the cloud during its travel time on the conveyor. Some particles of coffee fall to the conveyor at the beginning of the hood; others, which are not as completely agglomerated, travel further and, in practice, there is a deposit from the jets over substantially the first three-quarters of the length of the travelling conveyor.

It will be apparent that for a given rate of feed, the amount of moisture that is imparted to a product, such as coffee, as it passes through the steam jet and onto the conveyor and then over the conveyor is a function of the steam pressure at the nozzles 14, the residence time of the coffee on the conveyor (which can be controlled by conveyor speed), and the vacuum on the exhaust hood 18, which controls the characteristics of the vapour cloud overlying the conveyor.

These things are all relatively easy to control. They are further very efficient because it has been found that the coffee powder can be fed to the feed box 12 at room temperature to achieve a good moisture pick up.

Coffee at the end of the travel of the conveyor 16 treated under the above noted conditions will have an overall moisture content of between 4 and 8%. The agglomerates will not be very even in size and there will be a substantial portion of the coffee still in powdered form. While it might be possible to fuse and dry the output from the conveyor 16, it is preferable, in the case of coffee, to pass it through a second feeder box and steam nozzle and conveyor to increase the moisture content and to agglomerate more of the fine particles.

Conveyor 16 is, therefore, adapted to feed onto the vibrating screen of a Kason separator 15, which screens the agglomerated coffee through a six mesh screen and deposits it on a bucket-type elevator, generally indicated by the numeral 19, that elevates it an deposits it in a second feeder box 20. Kason is a trademark for a well known type of separator, which in this particular application functions to break up the larger piece of agglomerate. There is, as a result of the screening operation, a certain amount of particle dust created which appears in the output of the screen at the input to the bucket elevator 19. This is drawn up by means of the vacuum line 21 that connects with the wet vacuum take-up line 23 from the top of the exhaust hood.

The product falls from the second feeder box 20 which forms it into a vertically extending curtain in a similar manner to the feeder box 12.

The curtain is again intersected by steam from steam nozzles 22 which carry it onto the conveying surface of a second conveyor 24. Conveyor 24 also has an exhaust hood 26 which is adapted to exhaust excess moisture from above the conveying run of the conveyor at a rate that maintains a moisture vapour cloud above the coffee on the conveyor and avoids free condensation on the coffee. The moisture content of the coffee at the end of conveyor 24 is in the neighborhood of 7 to 10%. There are very few unagglomerated particles and it is in a fit condition for fusion and drying. The wet exhaust from over the conveyor 24 is conducted upwardly and into the exhaust line 23 for wet scrubbing and eventual discharge to the outside.

Fusion and drying are carried out in a fluidized bed, generally indicated by the numeral 28. Coffee from the conveyor 24 is continuously fed into a Jeffrey fluidized bed drier which has provision for maintaining an upward flow of air therethrough that is of sufficient velocity to maintain the agglomerated coffee particles in a fluidized condition at a depth of between 4 and 5 inches. The particles have a through-put time of about 30 seconds and the temperature of the air passing through the drier is about 250° F.

Air enters the fluidized bed as at 29 and leaves the fluidized bed at points along its full length as at 31, 33, 35 and 37. The air discharge from the fluidized bed, together with small entrained coffee dust, travels upwardly through line 39 and is connected to a dry collector system which includes a cyclone separator 41 that is adapted to separate the fine particles of coffee dust that are entrained in the air. The air is then exhausted to atmosphere outside of the building and the coffee dust can be returned to the beginning of the process for further agglomeration.

A fluidized bed used with success is one known commercially as a Jeffrey fluidized bed. It has a vibrating feeder 43 at its inlet. The outlet from the fluidized bed is fed to a bucket-type elevator, generally indicated by the numeral 30, and deposited on a double screen vibrating screen 32. Screen 32 has a large size first screen of about 8 mesh size that is adapted to screen any unduly large pieces of agglomerate for removal. If the process is working well, there is normally no product caught by the first larger screen. The second screen is a 40 mesh. This is the screen that screens the desired product size and the material caught by this screen is conducted to a surge hopper 33 and finally to a tote box 35 for the product. The throughput of the fine screen is coffee fines that are too small to be classified as agglomerated product, and these are drawn through the dry vacuum line 36 and conducted to the cyclone separator 41 for separation from the air in which they are entrained, and fed back through the feeder boxes. Some fines will pass with the output of the second screen and be conducted to the surge hopper. These are removed by a vacuum line 38 and similarly fed to the cyclone separator.

The size of the particles and pieces involved will vary with process details but with coffee the particles initially fed through the feed box 12 have a diameter of about one-thousandth of an inch. After steam agglomeration, many of the pieces have a diameter of about one-quarter of an inch. After fusion and drying, an average diameter is about one-eighth of an inch. These things are variable and the foregoing is by way of example. The important thing is the agglomeration by directing the steam jets over a conveyor with a controlled overlying atmosphere. This concept is advantageously combined with a fluidized bed for fusion and drying.

Specific details of the conveyor screens, fluidized bed and feed hopper have not been included in this application because their design or selection does not form part of this invention and to include it would unnecessarily burden this application. These things are known in the art and are capable of great variation. The bucket elevators, for example, are of a type known as Tiptrack. "Tiptrack" is a trade name. The separator at the end of the first conveyor is a Kason. "Kason" is a trade name for a type of suitable separator. The fluidized bed is of a manufacture known as Jeffrey, but other types and other makes would work equally well. The important thing is the use of a fluidized bed in this particular application.

In the fluidized bed, the coffee is heated and fuses. As it fuses, some moisture content is evaporated and with the loss in moisture, the fusion temperature drops considerably and drying takes place. The interrelationship between fusion, temperature and moisture content is known and is not discussed in detail in this application. It is thought sufficient in this application to note that the moisture content must be initially high so that fusion first takes place. Fusion temperature decreases with increasing moisture. With the resulting loss of moisture, drying takes place with the further application of heat. It has been found that agglomerated coffee with a moisture content of about 8% at least at the surface portions passing through a fluidized bed with a residence time of about 30 seconds and subjected to a heat of about 250° F. will probably become heated to about 204° F. and that this temperature and residence time is sufficient to fuse and dry the agglomerated coffee. Modifications of temperature and residence time to achieve a similar result will be apparent to those skilled in the art. The essential thing is the fusion and drying of the agglomerated product. An important thing about this invention is the apparatus and method by which the product is agglomerated and moistened. With Coffee, the agglomerating and moistening of the coffee is done in two stages and it is a feature of the invention that the moistening and agglomerating step can be repeated on a continuous basis in a simple manner as many times as required to build up a desired moisture content. The essence of this step is the entrainment of powdered material in a steam jet and the collecting of the entrained material on a moving conveyor, the atmosphere above which is controlled by means of an exhaust hood. The atmosphere is controlled in such a way that there is an efficient agglomerating and moisturizing of the product without unduly wetting it. An indication of the efficiency of the moistening and agglomerating is the fact that it is not necessary to pre-treat or pre-cool the powder before forming it into a curtain, as it is with many other methods. The product is not unduly heated at any stage during the agglomerating or moistening steps. Feed of the product takes place at ambient room temperature and the average rise of the temperature during contact by the steam jets is not much more than 10° F.

For some products a single pass through the steam nozzles and onto a conveyor is sufficient to impart sufficient moisture for fusing and drying, and it is not intended that the invention should be limited to the agglomerating and wetting of products that require more than one pass. The general process will work with a powdered food product that requires to be strengthened by agglomeration and fusing and drying, such as milk powder, dried fat emulsions, etc.

The fluidized bed is a method of fusing and drying that is particularly suitable to this process as a whole. It is not the only method that could be used but it combines especially well with the conveyors to provide a process with a good overall efficiency. An alternative method for fusing and drying, however, could be dropping the product into a conventional spray drier.

The embodiments of the invention in which an exclusive property or privilege is claimed are defined as follows:

1. A method of agglomerating a water-soluble product in fine powder form comprising (i) moistening and agglomerating the products by forming the product into a falling curtain, directing jets of steam into said falling curtain to entrain and carry the product to the conveying run of a conveyor, said jets of steam having a pressure sufficient to impart moisture to at least a substantial part of said product and cause said wetted product to form agglomerates, exhausting excess moisture resulting from said jets of steam from the atmosphere above the conveying run of said conveyor at a rate that maintains a water vapour cloud above a substantial portion of the conveying run of said conveyor, said cloud capable of imparting additional moisture to some of said product as it falls on said conveyor and during its residence time on said conveyor, collecting said moistened and agglomerated product at the end of the conveying run of said conveyor and (ii) fusing and drying said agglomerated and moistened product.

2. The method of claim 1 wherein said fusing and drying step is achieved by flowing the agglomerated and moistened powder through a heated fluidized bed, said fluidized bed having a temperature to initially fuse said product and then dry it on its passage therethrough.

3. The method of claim 2 wherein said product is coffee.

4. The method of claim 1 wherein said product is coffee.

5. The method of claim 3 wherein said coffee product is moistened and agglomerated a second time prior to fusing and drying.

6. The method of claim 5 wherein said fusing and drying step is achieved by flowing the agglomerated and moistened powder through a heated fluidized bed, said fluidized bed having a temperature to initially fuse said product and then dry it on its passage therethrough.

7. Apparatus for agglomerating a water-soluble product in fine powder form comprising means for forming said powder product in a falling curtain, means for passing a steam jet through said falling curtain to entrain powder and agglomerate and moisten at least a substantial part of said powder, a conveyor having a conveying run adapted to receive powder entrained in said steam jet, means for exhausting excess moisture from above the conveying run of said conveyor at a rate that maintains a moisture vapour cloud above a substantial portion of said conveying run and avoids substantial condensation on the conveying run, means for receiving powdered product from the terminal end of the conveying run, and means for fusing and drying said powdered product.

8. Apparatus as claimed in claim 7 in which said means for fusing and drying said product is a fluidized bed.

References Cited
UNITED STATES PATENTS

| | | | |
|---|---|---|---|
| 2,977,203 | 3/1961 | Sienkiewicz et al. | 99— DIG. 4 |
| 3,143,428 | 8/1964 | Reimers et al. | 99—DIG. 4 |
| 3,306,958 | 2/1967 | Gidlow | 99—DIG. 4 |
| 3,506,457 | 4/1970 | Gidlow et al. | 99—DIG. 4 |
| 3,527,647 | 9/1970 | Hager | 99—DIG. 4 |

TIM R. MILES, Primary Examiner

W. L. MENTLIK, Assistant Examiner

U.S. Cl. X.R.

99—DIG. 4, 199; 23—313